UNITED STATES PATENT OFFICE.

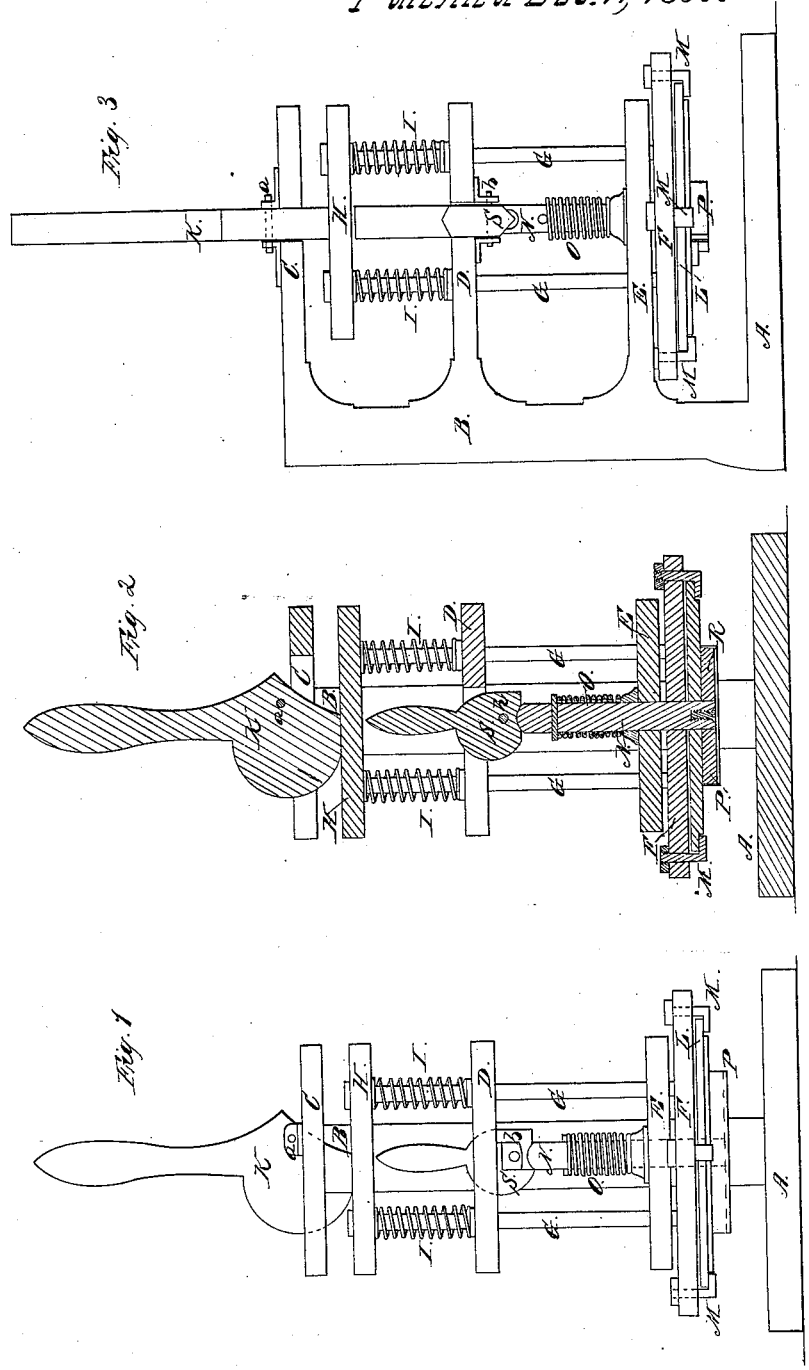

CHAS. RICE, OF BOSTON, AND S. H. WHORF, OF ROXBURY, MASSACHUSETTS.

MACHINE FOR CUTTING ARTICLES FROM LEATHER.

Specification of Letters Patent No. 13,920, dated December 11, 1855.

*To all whom it may concern:*

Be it known that we, CHARLES RICE, of Boston, in the county of Suffolk, and SYLVANUS H. WHORF, of Roxbury, in the county of Norfolk, State of Massachusetts, have invented an Improved Machine for Cutting or Stamping Articles from Leather or Various other Materials, the same being particularly applicable for stamping out and goring shoe uppers; and we do hereby declare that the same is fully described and represented in the following specification and in the accompanying drawings, letters, figures, and references thereof.

Of such drawings Figure 1, is a front elevation of said machine. Fig. 2, is a side view. Fig. 3 is a vertical and transverse section of it.

A, therein exhibits the bed plate or table of the machine. From such bed plate a post B, extends upward and supports three horizontal shelves C, D, E, arranged over and parallel to the bed plate, as seen in the drawings. Directly between the lower shelf E, and the bed A, there is a circular platen F, which is supported in position by a series of upright rods G, G, G, G, each of which extends upward through the two disks or shelves D, E, and is fastened to one common cap plate H, arranged immediately under the upper disk C, and supported on the stationary shelf D, by a series of springs I, I, which respectively envelop rods G, G. A cam lever K, is applied to the upper shelf C, or turns on a fulcrum *a*, supported thereby as seen in Figs. 1, and 2, such cam lever being for the purpose of depressing the platen by being brought into action on its cap plate H, as occasion may require. Against the under surface of the platen there is a rotary plate or disk L, which is furnished with a series of screw clamps M, M, M, for the purpose of confining it to the platen. The said plate L, turns freely upon a vertical pitman N, which projects downward through the platen, and the shelf E, slides vertically and freely through them and is supported on an elevating spring O, arranged and resting on the shelf E, as seen in the drawings.

Affixed to the under side of the rotary plate L, is a cutting and goring die P, which extends downward from the plate, and has a pack clamp R, disposed within it and so applied to the pitman N, as not only to be capable of rotating freely thereon in a horizontal plane; but of being immovable in other respects relatively to the pitman, it being moved either upward or downward by the pitman which is operated or forced downward by a second cam lever A, which when in use turns on a fulcrum *b*, sustained by the middle shelf D.

From the above it will be seen that whenever the adjustable plate L, is revolved horizontally, it will produce a corresponding rotary movement of the pack clamp R.

In operating with the above described machine a series or pack of sheets of leather, is first laid on the bed A, and directly under the goring and forming die P; this having been accomplished the pack clamp R, is next to be forced downward so as to confine the pack to the bed. Next the platen is to be depressed so as to carry the cutting die in contact with and cause it to cut entirely through the pack so as to form by one downward movement, several uppers properly cut and gored.

In order that the cutting and goring die may be accommodated to the pack of skins or sheets of leather or cloth, or such as may be, and so as to cut up the same to the best advantage or with the least waste of material, we apply the cutting die to the platen by means of the rotary plate as described; and we also apply the pack clamps to its shaft or pitman in manner as specified.

The manner in which we have arranged the operative mechanism of the pack clamp, with respect to that by which the cutter is actuated, renders the machine very compact and useful for the purpose for which it is intended. An important feature in this arrangement, is the disposition of the bearing plate of the platen which is placed over the pitman and its cam lever, and between the upper shelf and its cam lever; the platen being connected with such plate by means of the upright rods arranged as seen in the drawings. Such an arrangement brings the cam levers free from one another and avoids the employment of one shaft within a tubular shaft. We are aware that in machinery for stamping or cutting out heels of boots, cutting dies have been applied to a platen, by means of movable and adjustable levers or bars, and in such machinery, a bent lever was used, to hold the leather upon the bed. Such devices however differ materially from what we claim as new and for cutting or stamping out uppers, the pack clamp employed by us being arranged within the cutting knife and applied to a separate mandrel or shaft, and made to revolve on such shaft and with the plate carrying the knife. We are also aware that in a sole cutting machine, a cutting knife has had imparted to it an intermittent, reciprocating, rotary, movement in a semicircle. Also, that the said cutter or knife has had a spring plate or discharger arranged within it, and for the purpose of discharging a sole from it after the same may have been cut by the knife. These devices differ essentially from what we claim, for in our machine the mechanism for elevating and depressing the pack clamp is entirely independent of that for elevating and depressing the knife, inasmuch, as the pack clamp is not elevated or depressed in any respect by the platen or with the knife.

The machines hereinbefore alluded to for cutting heels and soles, are not applicable to the formation of uppers. Important changes would have to be made in them in order to render them useful for such a purpose, or to give to them the advantages of our machine. The improvements claimed by us afford advantages as hereinbefore specified, or in other words, the ready adaptation of the cutting and holding machinery to a pack of sheets or skins of leather, in order that the same may be cut into uppers with little or no waste.

We therefore lay no claim to any of the devices or combinations contained in the machines described in the specification of Letters Patent, numbered 6095, and 12128, but,

We claim—

1. Combining the cutting die with the platen, by means of a rotary and adjustable plate L, in combination with so applying the pack clamp to its pitman that it may turn thereon, when the die or cutter is revolved in manner and for the purpose as specified.

2. We also claim the above described arrangement of the operative mechanism of the pack clamp, and that by which the cutter is either depressed or elevated.

In testimony whereof we have hereunto set our signatures this twenty second day of August, A. D. 1855.

CHARLES RICE.
SYLVANUS H. WHORF.

Witnesses:
R. H. Eddy,
F. P. Hale, Jr.